United States Patent
Talapureddi et al.

(10) Patent No.: US 12,552,548 B2
(45) Date of Patent: Feb. 17, 2026

(54) SMART WHEEL CHOCKS AND RELATED SYSTEMS

(71) Applicant: Honeywell International Inc., Charlotte, NC (US)

(72) Inventors: Murali Mohan Talapureddi, Hyderabad (IN); Madhava Gadicherla, Bangalore (IN); Saravanakumar Gurusamy, Bangalore (IN); Swetha Balasa, Bangalore (IN); Naga Rama Pratap Bontha, Hyderabad (IN); Kevin Suits, Phoenix, AZ (US); Yash Thawani, Bangalore (IN); Haricharan Reddy, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 458 days.

(21) Appl. No.: 18/155,953

(22) Filed: Jan. 18, 2023

(65) Prior Publication Data
US 2024/0124155 A1    Apr. 18, 2024

(30) Foreign Application Priority Data
Oct. 13, 2022  (IN) .............................. 202211058510

(51) Int. Cl.
*B64F 1/16*    (2006.01)
*B60T 3/00*    (2006.01)
(Continued)

(52) U.S. Cl.
CPC ............... *B64F 1/16* (2013.01); *B60T 3/00* (2013.01); *G06K 7/1417* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 9,751,702 B1 * | 9/2017 | Hoofard | B60T 3/00 |
| 10,329,105 B2 | 6/2019 | Hoofard et al. | |

(Continued)

FOREIGN PATENT DOCUMENTS

| | | | | |
|---|---|---|---|---|
| CN | 208897042 U | 5/2019 | | |
| CN | 110626517 A * | 12/2019 | ................ | B64F 1/16 |

(Continued)

OTHER PUBLICATIONS

CN-110626517-A: English Machine Translation (Year: 2019).*

*Primary Examiner* — Melanie Torres Williams
(74) *Attorney, Agent, or Firm* — Alston & Bird LLP (57) ABSTRACT

A smart wheel chock includes a chock body including a ground engaging surface and a wheel engaging surface for engaging a wheel of a vehicle; a processor housed within the chock body; a position tracking sensor housed within the chock body, wherein the position tracking sensor is configured to detect a location of the wheel chock; a wireless communication module in communication with the processor and configured to transmit the location of the wheel chock; a power system configured to supply power to the processor and wireless communication module; and a visual indicator on the chock body, wherein the visual indicator is configured to be visible while the chock body is engaged with the wheel, and wherein the visual indicator includes a unique identifier for the smart wheel chock.

20 Claims, 7 Drawing Sheets

(51) Int. Cl.
*G06K 7/14* (2006.01)
*H04W 4/029* (2018.01)

(56) References Cited

U.S. PATENT DOCUMENTS

| | | | |
|---|---|---|---|
| 10,668,913 B2 | 6/2020 | Metz et al. | |
| 2011/0168501 A1* | 7/2011 | Henry | B60T 3/00 |
| | | | 362/183 |

FOREIGN PATENT DOCUMENTS

| | | |
|---|---|---|
| CN | 112649894 A | 4/2021 |
| EP | 3272594 B1 | 4/2020 |

\* cited by examiner

SMART WHEEL CHOCKS AND RELATED SYSTEMS

CROSS-REFERENCE TO RELATED APPLICATION(S)

This application claims the benefit of priority to Indian Application No. 202211058510, filed Oct. 13, 2022, the entirety of which is incorporated by reference herein.

TECHNICAL FIELD

Various embodiments of the present disclosure relate generally to the field of identifying and maintaining vehicles and, more particularly, to smart wheel chocks and related systems.

BACKGROUND

Certain high value assets (HVA) (e.g., aircraft, aerospace asset, etc.) may require capabilities for constant tracking. Constant tracking may facilitate operational readiness, meet insurance requirements, as well as provide owner/operator piece of mind. However, in certain environments, tracking devices installed on or otherwise powered by the HVA may not be independently powered. Moreover, certification requirements associated with aircraft and other HVAs can place unnecessary certifications on devices for constant tracking, making their implementation unnecessarily complicated.

One system that is common to many, if not all, aircraft is the aircraft wheel chock—used to physically prohibit movement of the aircraft by friction with the wheel. Aircraft chocks are generally interchangeable between aircraft and relatively simple to operate: personnel may place them in front of, behind, or around a wheel and the aircraft may remain in place when grounded. However, their interchangeability and lack of any electronics or power supply mean they are simply physically prohibiting movement and providing no other benefit to the owner/operator of the HVA. Hence, a ubiquitous, relatively large aircraft operations support part is serving merely a simple purpose, when it could solve one or more complex problems associated with storage and maintenance of HVAs. The present disclosure is directed to overcoming one or more of these above-referenced challenges.

SUMMARY OF THE DISCLOSURE

According to certain aspects of the disclosure, methods and systems are disclosed for smart wheel chocks and related systems.

For instance, in one embodiment a smart wheel chock includes a chock body including a ground engaging surface and a wheel engaging surface for engaging a wheel of a vehicle; a processor housed within the chock body; a position tracking sensor housed within the chock body, wherein the position tracking sensor is configured to detect a location of the wheel chock; a wireless communication module in communication with the processor and configured to transmit the location of the wheel chock; a power system configured to supply power to the processor and wireless communication module; and a visual indicator on the chock body, wherein the visual indicator is configured to be visible while the chock body is engaged with the wheel, and wherein the visual indicator includes a unique identifier for the smart wheel chock.

In another embodiment, a smart wheel chock system for a vehicle includes: a user chock locating device; a chock assembly including a plurality of chock bodies, each chock body including a ground engaging surface and a wheel engaging surface, wherein the chock assembly is configured to engage a wheel at at least two points, wherein the at least two points are on opposite sides of the wheel with respect to a ground contact point of the wheel; a processor housed within at least one of the plurality of chock bodies; a position tracking sensor housed within at least one of the plurality of chock bodies, wherein the position tracking sensor is configured to detect a location of the wheel chock system; a wireless communication module in communication with the processor and configured to transmit the location of the wheel chock system to the user chock locating device; a power supply configured to provide power to the processor and the wireless communication module; and a visual indicator on at least a non-ground or wheel engaging surface of the chock assembly, wherein the visual indicator remains visible when the chock assembly is engaged with a wheel of the vehicle, and wherein the visual indicator includes a unique identifier for the smart wheel chock system.

In yet another embodiment, a smart wheel chock for inhibiting motion of a vehicle includes: a chock body including a ground engaging surface and a wheel engaging surface, wherein the ground engaging surface and the wheel engaging surface meet at an edge of the chock body; a processor housed within the chock body; a position tracking sensor housed within the chock body, wherein the position tracking sensor is configured to detect a location of the wheel chock; a wireless communication module in communication with the processor and configured to transmit the location of the wheel chock via one or more of satellite communication, cellular communication, radio communication, and/or wireless local area network communications; a power system configured to supply power to the processor and wireless communication module, wherein the power supply includes a rechargeable battery that is independent of a power supply external to the smart wheel chock; and a visual indicator on the chock body, wherein the visual indicator remains visible when the chock body is engaged with a wheel of the vehicle, and wherein the visual indicator includes a unique identifier for the smart wheel chock.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to the field of identifying and maintaining vehicles and, more particularly, to smart wheel chocks and related systems for identifying and maintaining vehicles. While this disclosure describes the methods and systems with reference to aircraft, it should be appreciated that the present methods and systems may be applicable to various other vehicles that are parked or stored on the ground.

Figure 1:
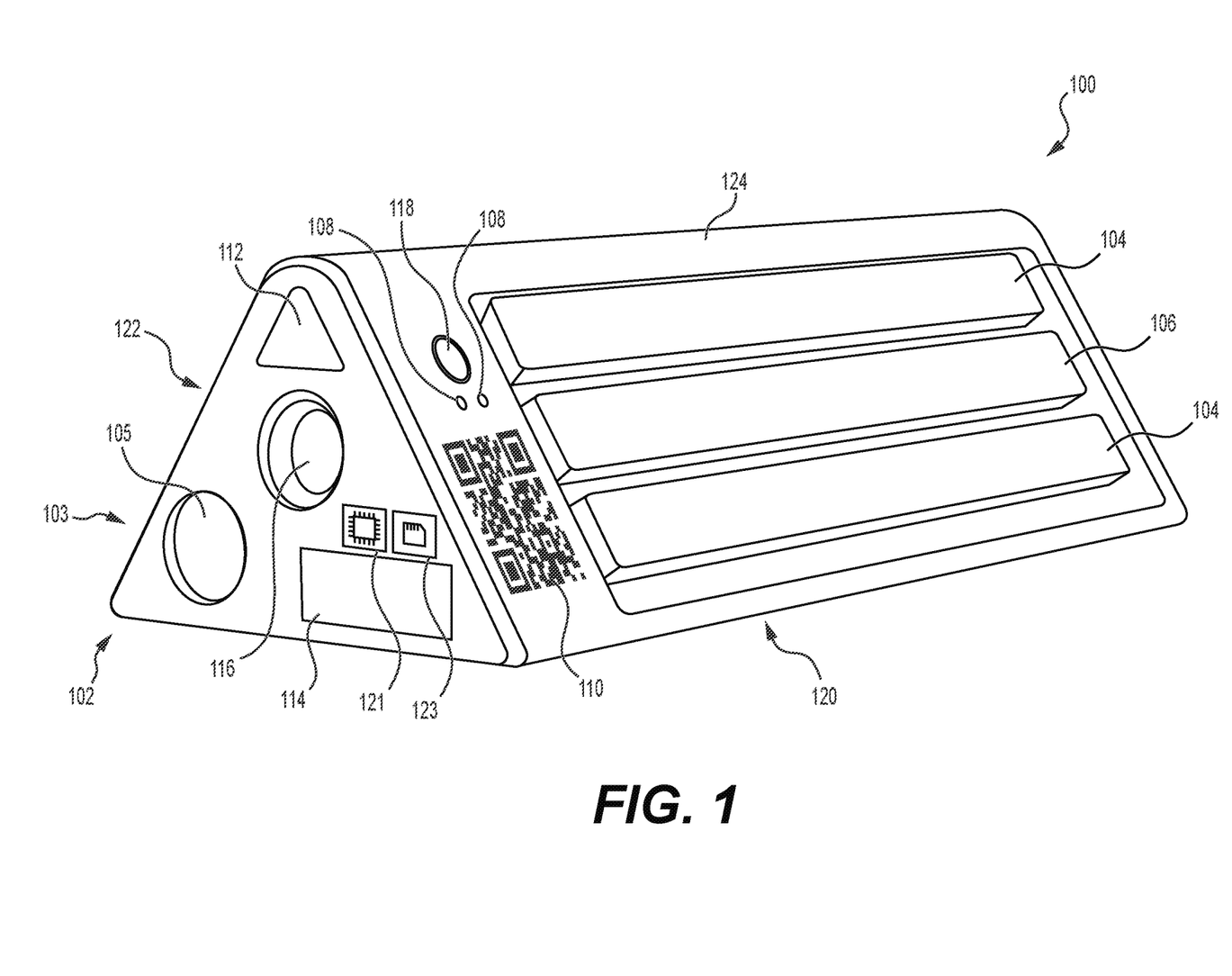
FIG. 1 depicts a perspective view of an end of a smart wheel chock, according to one or more embodiments.
Figure 2:
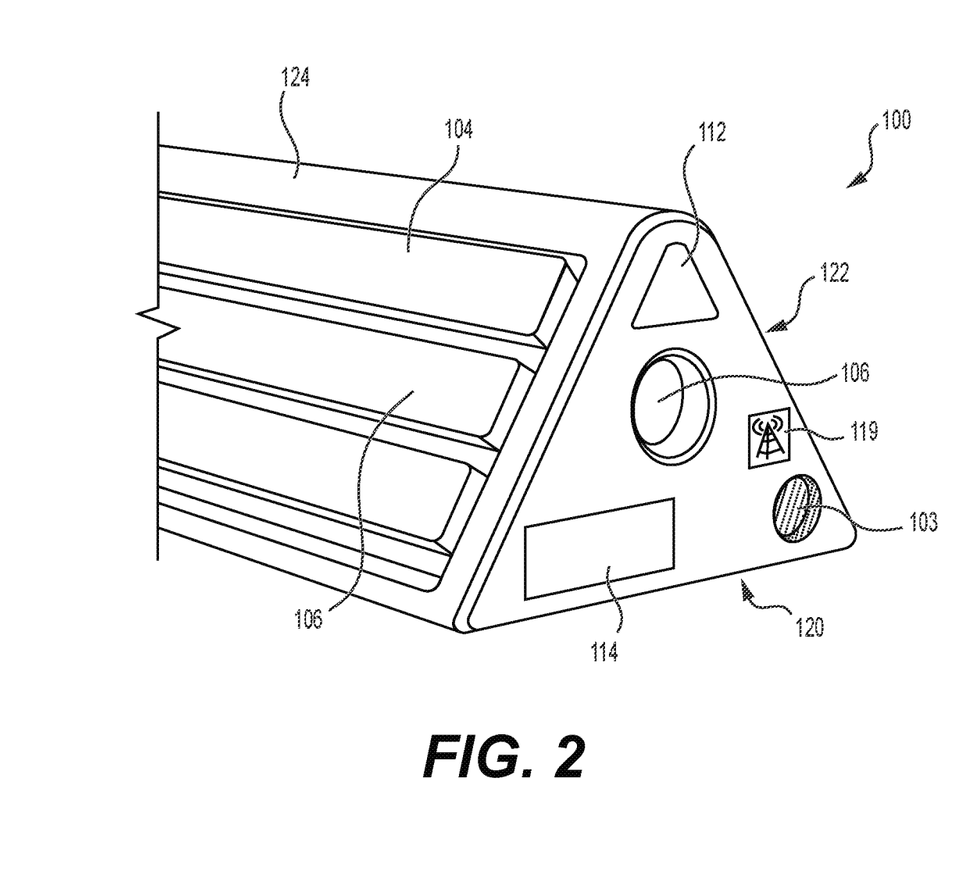
FIG. 2 depicts a perspective view of an end of a smart wheel chock opposite the end depicted in FIG. 1.

FIGS. 1 and 2 depict a smart wheel chock 100 for engaging a wheel of a vehicle to inhibit or prohibit movement of the vehicle. The smart wheel chock 100 (or simply "chock") includes a power supply system 102 which may include a power conduit 103 for a removable battery 105, one or more solar panels 104, one or more lights 106, one or more antennae 108, a unique identifier 110, a first writing surface 112, a second writing surface 114, a connector inlet 116, a camera 118, a wireless communication device 119 (schematically depicted), a processor 121 (schematically depicted), and a memory (schematically depicted). The specific features and associated systems of the chock 100 shown in FIG. 1 are exemplary only and not intended to limit the smart wheel chock 100 to any particular embodiment or arrangement of components or features.

The chock 100 generally comprises multiple surfaces, which surfaces may meet at edges. The particular embodiment depicted in FIG. 1 includes a ground engaging surface 120, a wheel engaging surface 122, and a smart surface 124. The ground engaging surface 120 may generally face the ground and may include one or more surface enhancement features for enhancing the level of friction between the chock 100 and ground such that the asset held by the chock 100 is less likely to move when a wheel rests against the wheel engaging surface 122. The wheel engaging surface 122 may be, for example, a matte surface and may include one or more features for increasing friction with the asset wheel to prevent the asset wheel from rotating when engaged with the wheel engaging surface 122.

The smart surface 124 may include one or more features for charging a power supply of the chock 100, one or more features for identifying the chock 100 and/or the asset associated therewith, and one or more other features. For example, the smart surface 124 may include the one or more solar panels 104.

The solar panels 104 may comprise a plurality of solar cells that are capable of converting solar energy into electrical charge to charge the power supply 102 (e.g., the rechargeable battery 105). The solar panels 104 may be mechanically and electrically coupled to the chock 100 and may be engineered such that they can support the weight associated with stopping, arresting, or prohibiting the movement of an asset while the chock 100 is installed beside an asset wheel. The light 106 may be an LED, LED array, UV, or other light which may be used to illuminate a space surrounding the chock 100 such that a user of the chock 100 is assisted in low light conditions. In some embodiments, the light 106 may include multiple LED arrays or panels including multiple LED colors. The LED panel may be used to indicate, for example, a tail number of an aircraft intended to park at the chock 100 (so the pilot piloting the aircraft can know exactly to which chock to pull up to). The LED panel could also indicate a pairing of an asset with the chock 100 or one or more other features of the chock 100 as will be described in greater detail herein.

The power supply 102 of the chock 100 may include one or more removable and/or rechargeable batteries 105 and may generally supply power to the components of the chock 100 such that the chock 100 is self-powered. In some embodiments, the power supply 102 may store sufficient electrical storage in order to supply power to the systems of the chock 100 for multiple days, weeks, or months at a time. In some embodiments, the battery 105 may be removed in order to charge the power supply 102 and in other embodiments the battery 105 may be capable of being charged while the battery 105 is inside the chock 100. For example, the battery 105 may be charged using electricity created by the solar panels 104 and/or power supplied by an electric grid (not shown) while the battery 105 is installed in the chock 100.

The camera 118 may be powered by the power supply 102 and may be configured to face the asset when the chock 100 is in place holding the asset in position on an airfield, in a hangar, or in another storage location. The camera 118 may be a visual, infrared, or other camera configured to capture image data of the surrounding area such that it can capture image data of an asset that is being held in place with the chock 100. In some embodiments, the asset (not shown) may have one or more identifying marks or visible, infrared, or other camera-identifiable images that may be used to determine a specific identity of the asset. For example, an asset may have a QR code beneath its fuselage which QR code may be captured using the camera 118 when the chock 100 is in place and arresting movement of the asset such that the asset can be uniquely identified with the image data captured by the chock 100. The image data may be sent from the chock using, for example, a wireless communications device 126.

The unique identifier 110 may be, for example, a quick read (QR) code, a bar code, a glyph, an RFID tag, a sticker, etc. and may be associated with the chock 100 in a database external to the chock 100. In some embodiments, the unique identifier 110 may be permanently or temporarily associated with an asset. The unique identifier 110 may be associated with an asset using, for example, a tail number, a vehicle identification number, or other asset identifying feature. The unique identifier 110 may be scanned with a camera or other scanner to capture data associated with the unique identifier which may captured data may be used to identify the chock 100.

The writing surface 112 and the second writing surface 114 may provide a surface for marking the chock 100 with hand-written identifying or other information such that users of the system can make notes and record information associated with use of the chock 100.

The connector inlet 116 may provide a space for connecting a rope, chain, or other connecting device for coupling one chock 100 with another chock to form a chock system for surrounding a wheel of an asset as will be explained in greater detail herein.

The processor 121 may include a single processor or multiple processors configured to receive inputs, display outputs, and generate commands to control the operation of components of the chock 100. The processor 121 and the memory 123 may be configured as a control module which control module may include a memory, a secondary storage device, processor(s), such as central processing unit(s), networking interfaces, or any other means for accomplishing tasks consistent with the present disclosure. The memory or secondary storage device associated with the control module may store data and software to allow the control module to perform its functions, including the functions described herein. One or more of the devices or systems communicatively coupled to the processor 121 and the memory 123 may be communicatively coupled over a wired or wireless network, such as the Internet, a Local Area Network, WiFi, Bluetooth, or any combination of suitable networking arrangements and protocols. The processor 121 and the memory 123 may be communicatively coupled with other aspects of the chock 100 (e.g., the wireless communications device 119, the camera 118, etc.) to send and receive data from the other aspects.

The wireless communications device 119 may be configured to send and receive wireless signals to and from various external systems. In some embodiments, the wireless communications device 119 may be incorporated into the chock 100. In other embodiments, it may be a separate component. The wireless communications device 119 may aid the chock 100 in device location (e.g., an area of a facility such as a runway, a hangar, a maintenance facility, etc.). The wireless communications device 119 may be communicatively coupled to a wireless communications network as described in greater detail herein. Generally, the wireless communications device 119 may receive wireless signals that may be indicative of a location of the chock 100 within the area and a location of one or more assets. The wireless signals may correspond with, for example, GPS or other signals received by the wireless communications device 119. In some embodiments, the wireless communications device 119 may comprise a GNSS (e.g., GPS, etc.) signal transmitter/receiver and may be capable of receiving and sending a GNSS signal. In some embodiments, the wireless communications device 119 may be communicatively coupled to a wireless communications network to send and receive wireless communications from the network. In some embodiments, the wireless communications device 119 may be configured to generate and/or receive Bluetooth signals (e.g., BLE, etc.) such that the chock 100 can communicate with one or more external systems using a Bluetooth connection. The external devices (not shown) may couple with the chock 100 to send and/or receive data from the chock. Additionally, the wireless communications device 119 may be a wireless router and may be used to configure a local area network (LAN) to which LAN one or more external devices or systems may communicatively couple. For example, an asset and one or more additional smart chocks similar to the chock 100 may communicatively couple to a LAN created by the chock 100. In some embodiments, the wireless communications device 119 may comprise an RFID reader which may read one or more RFID tags on external or internal systems. For example, the wireless communications device 119 may read one or more RFID tags on a wheel of an asset, the body of an asset, one or more other chocks, etc.

Figure 3:
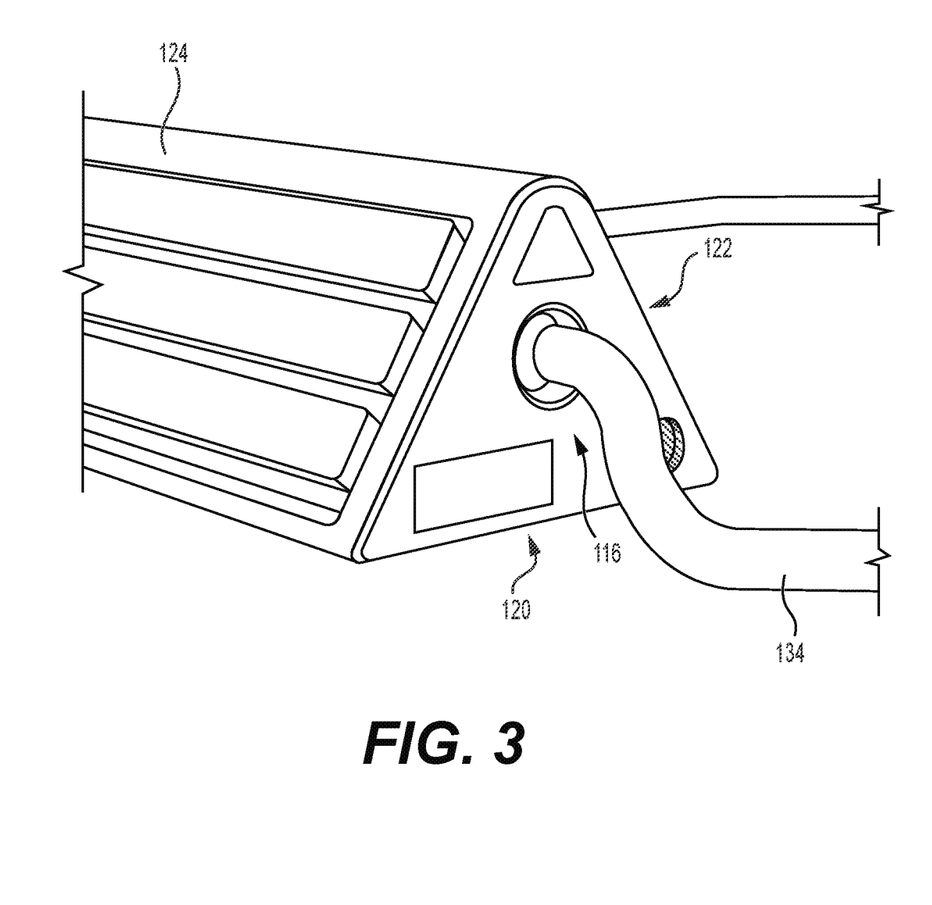
FIG. 3 depicts the end of the smart wheel chock of FIG. 2 with a power conduit attached.

FIG. 3 shows the chock 100 coupled to a power conduit 134. The power conduit 134 may provide electrical power to one or more systems of the chock 100 (e.g., to power the processor 121, the camera 118, charge the battery 105, etc.) The power conduit 134 may be connected to an external power supply.

Figure 4:
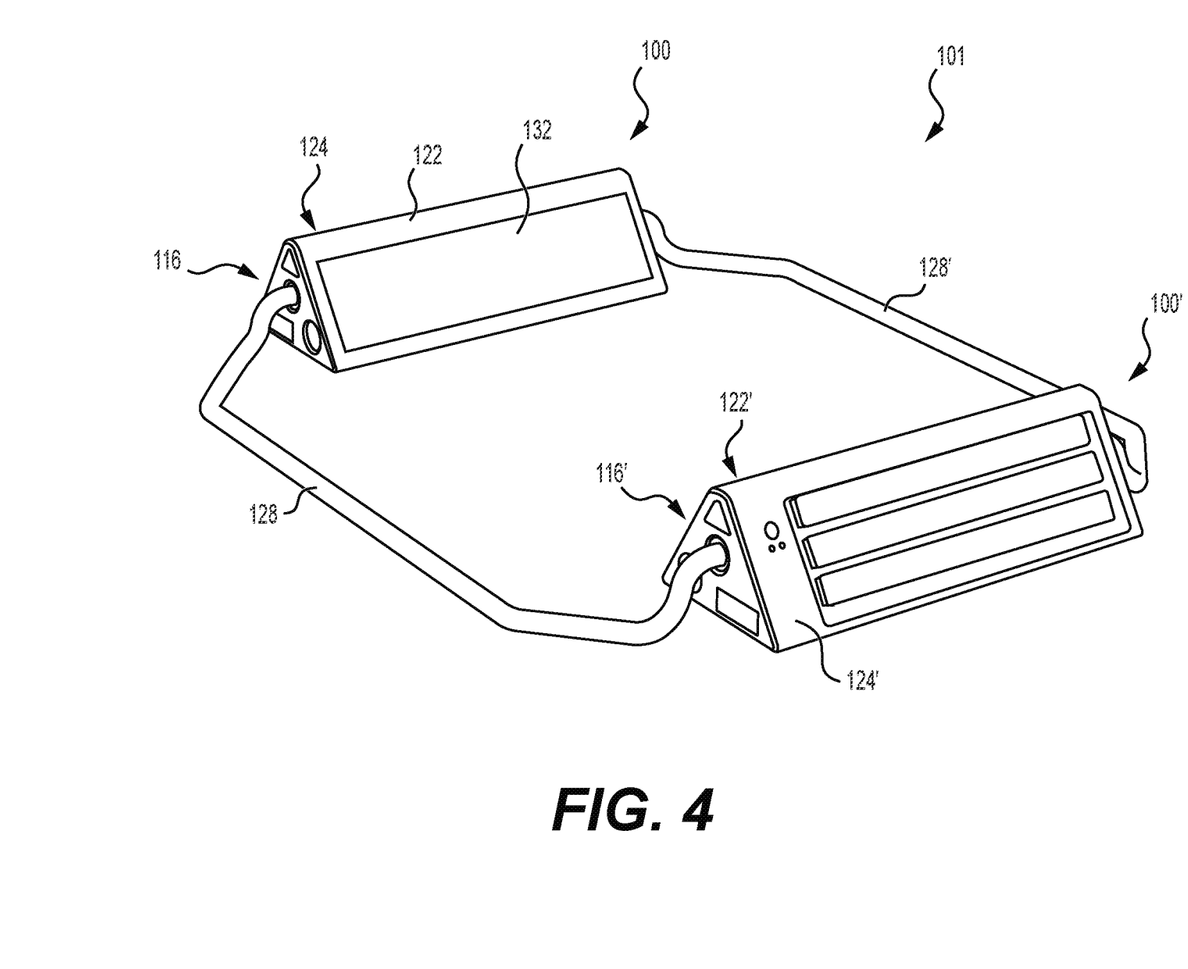
FIG. 4 depicts a dual chock arrangement.

FIG. 4 shows a chock system 101 including a chock 100 and a second chock 100'. As shown, the chock 100 and the second chock 100' are equivalent, but this is not required. In some embodiments, the first chock 100 and the second chock 100' are not equivalent. For example, the chock 100 may be a smart chock and the second chock 100' not be a smart chock. A wheel engaging surface 122 and a second wheel engaging surface 122' may face inward and be configured to surround a wheel (not shown) of an asset and the chock 100 and the second chock 100'. In some embodiments, the wheel engaging surface 122 may include a matte surface 132. The second wheel engaging surface 122' may also include a matte surface. The chock 100 and the second chock 100' are coupled by the connector 128 and the second connector 128'. The connector 128 may connect to the chock 100 and the second chock 100' at the connector inlet 116 and the second connector inlet 116'. The connector inlet 116 and the second connector inlet 116' may be, for example, a threaded connection, a magnetic coupler, or some other coupling device capable of removably coupling the connector 128 with the chock 100 and the second chock 100'. The connector 128 and the second connector 128' may couple the chock 100 and the second chock 100' when they surround the wheel (not shown) such that the chock 100 and the second chock 100' do not separate when one or both of them is installed to prevent motion of an asset.

Figure 5:
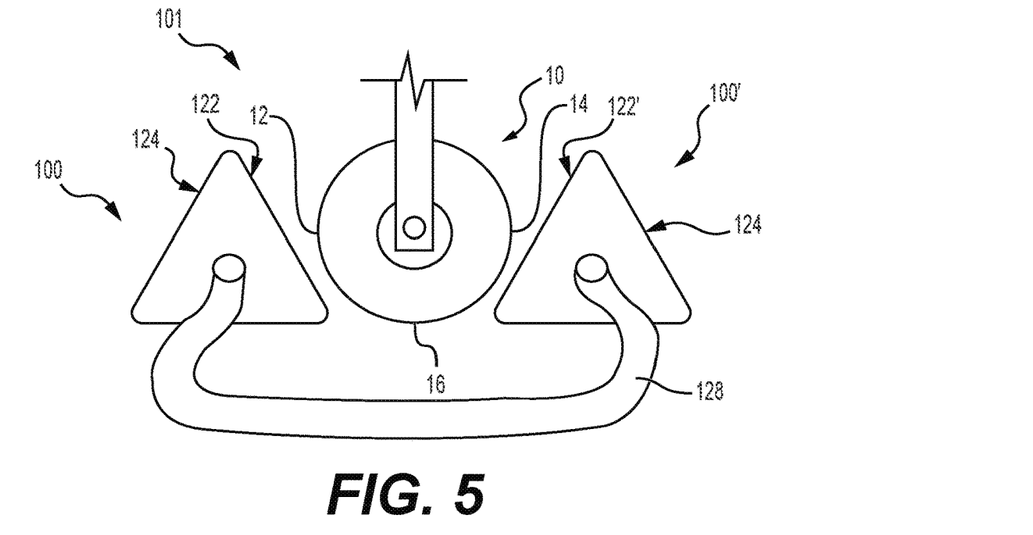
FIG. 5 depicts a wheel of a vehicle engaged with a smart wheel chock.

Referring to FIG. 5, the dual chock system 101 of FIG. 4 is shown engaged with a wheel 10 of an asset (not shown in full). The wheel engaging surface 122 of the chock 100 is forward of the wheel 10 and engages a first contact point 12 of the wheel 10 and the second wheel engaging surface 122' of the second chock 100' is aft of the wheel 10 and engages a second contact point 14 of the wheel 10 to inhibit motion of the wheel forward and aft. The first contact point 12 and the second contact point 14 are on opposite sides of the wheel 10 and surround (essentially) a ground contact point 16 of the wheel 10. The chock 100 and the second chock 100' are connected by the connector 128. In some embodiments, the connector 128 may be configured such that electrical power can flow from one of the chocks to the other such that the dual chock system 101 can be electrically powered by only one of the chocks. For example, the connector 128 may be an electrical connector with an electrically conductive core and two adaptive ends configured to fit into electrical connections on or in the chock 100 and the second chock 100'.

Figure 6:
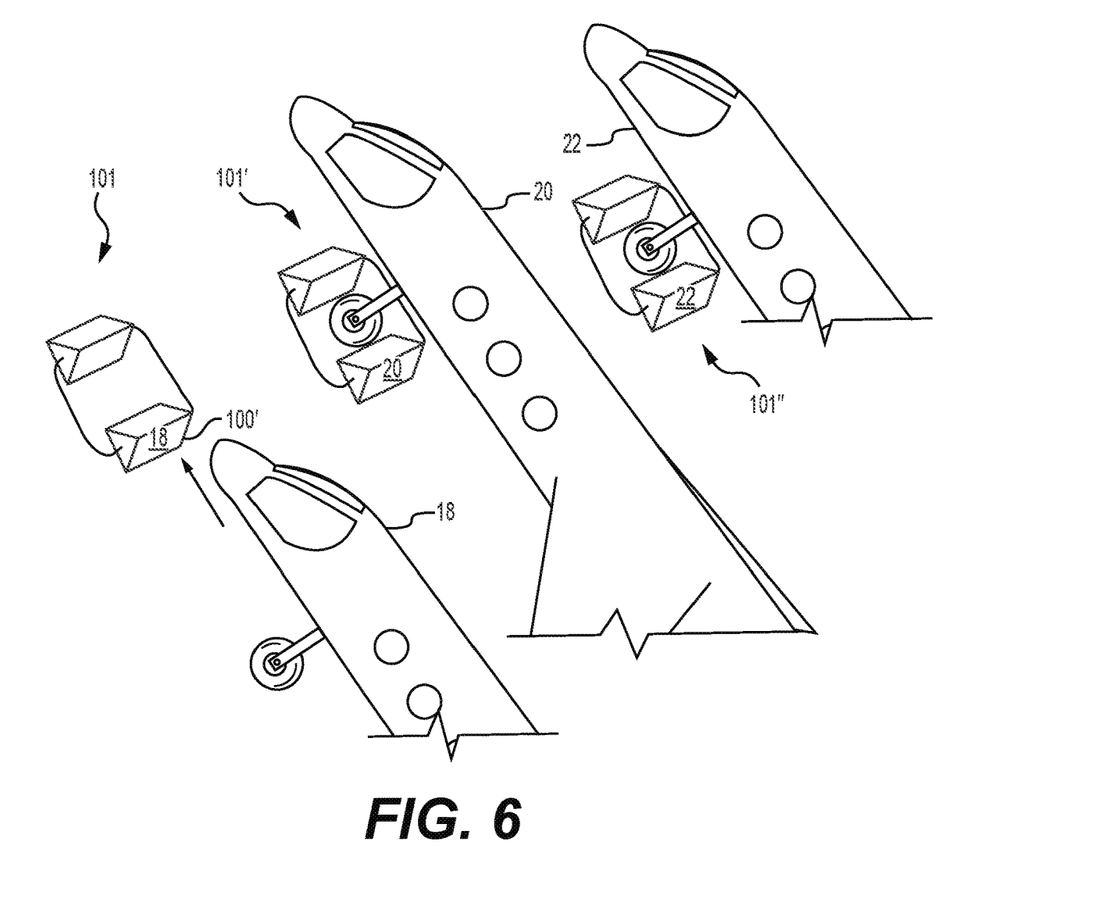
FIG. 6 depicts multiple vehicles engaged with smart wheel chocks.

Referring to FIG. 6, an asset 18 is shown moving forward toward a dual chock system 101. Second asset 20 and third asset 22 are already engaged with a second dual chock system 101' and a third dual chock system 101", respectively. The aft chock 100' of the dual chock system 101 may indicate to the asset 18 that it is the intended chock system 101 for the asset 18 by generating a signal which may be visible to a pilot of the asset 18 as the asset 18 approaches the dual chock system 101. For example, the aft chock 100' may light up a green LED panel of the light 106 (FIG. 1) and/or display an aircraft tail number associated with the asset 18 (e.g., as shown in the the figure: "18"). As the asset 18 pulls forward to engage the dual chock system 101, one or more of the forward chock 100 and the aft chock 100' may receive data from the asset 18 indicating that it is the correct or incorrect asset for coupling with the chock system 101. For example, a camera on the aft chock 100' (e.g., the exemplary camera 118 of FIG. 1) may capture visual data of the asset 18 which may be compared to visual data in a database of assets, may be verified by an external user, etc. In some embodiments, the asset 18 may broadcast an RFID signal which may be read by an RFID reader of the dual chock system 101. Other methods of identifying the asset 18 are contemplated.

The asset 18 may be identified by the dual chock system 101 and a user may place the dual chock system 101 in place surrounding a wheel of the asset 18 (e.g., the forward wheel(s)) once the asset 18 is in a suitable position for parking. The dual chock system 101 may then be associated with the asset 8 such that the location of the asset can be determined based on the location of one or more of the chocks of the dual chock system 101. For example, a user may scan a unique identifier 110 of the forward chock 100 and associate the unique identifier 110 with a tail number of the asset 18. Because the location of the chock 100 is known (e.g., based on a location identified with the wireless communications device 119) the location of the asset 18 can be deduced. The dual chock system 101 may thus provide a redundant source of asset location or singular source of asset location in the instance of shutdown of one or more location tracking devices of the asset (e.g., in the case of a complete power down of the asset, during maintenance of on-board tracking systems, for security purposes, etc.)

Figure 7:
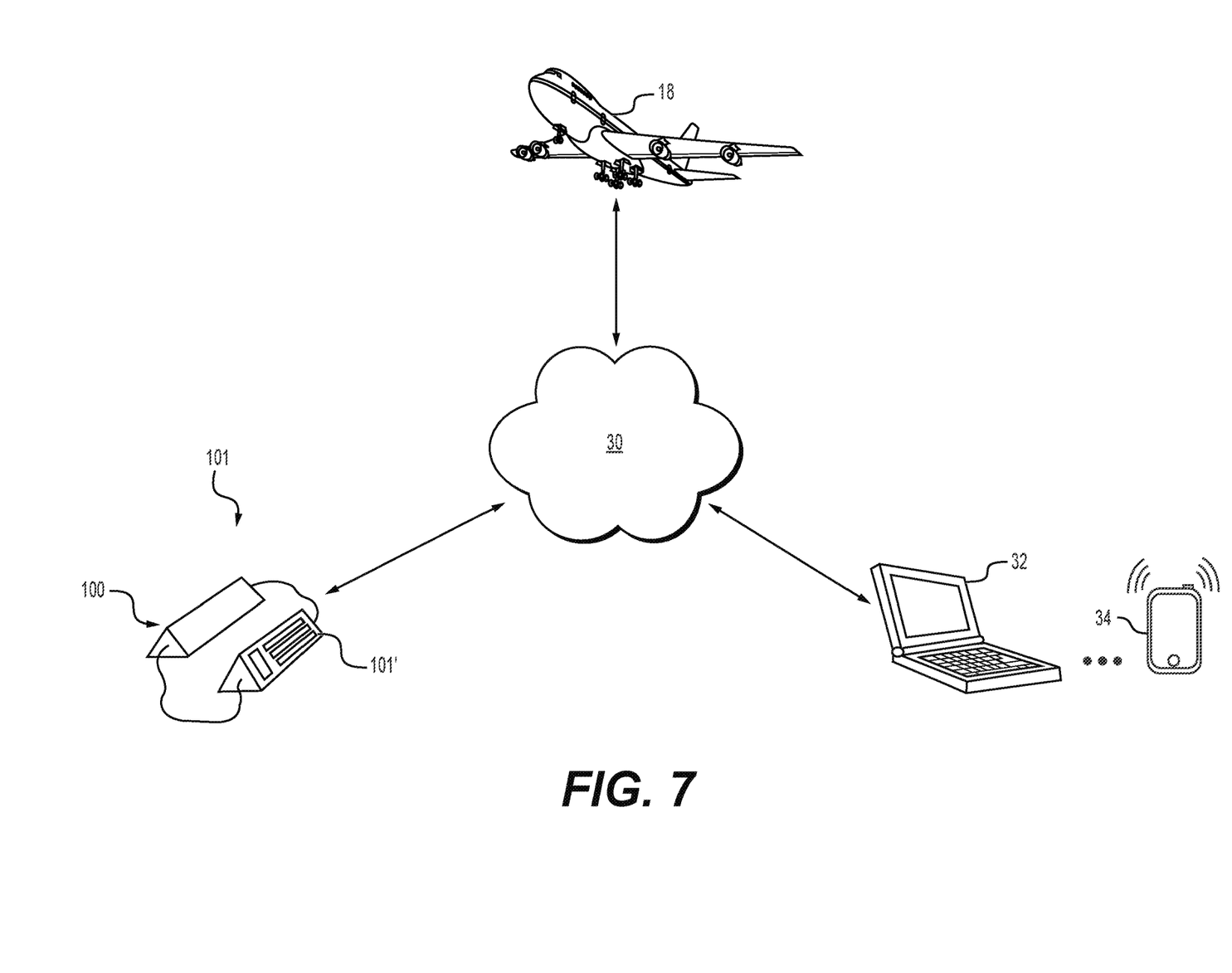
FIG. 7 depicts an exemplary computing environment for implementing one or more of the systems and methods described herein.

Referring now to FIG. 7, an exemplary computing environment or enabling communicative interaction of one or more of the systems described herein is shown. FIG. 7 shows network 30 that communicatively couples an exemplary asset 18, a chock 100 that may be part of a dual chock system 101, a digital device 32, and one or more handheld digital devices 34 (collectively referred to as "digital device"). The network 30 may be an example of an environment for implementing various methods and systems according to the present disclosure. The network 30 may include a plurality of nodes that may be connected to each other through the network 30 (e.g., the chock 100, the second chock 100', the asset 18, and the devices). Network 30 may include a computer system on board an asset such as the asset 18. The asset may be one or more of an airplane, a helicopter, an unmanned aerial vehicle (UAV), an aerospace asset, or other type of aircraft or other vehicle (e.g., a luggage cart, a truck, etc.) A computer system of an aircraft may, for example, include a flight management system (FMS) or other system used in the control or operation of the aircraft. Such computer systems may be part of the avionics onboard the aircraft, and may be coupled to a display inside the aircraft, such as a cockpit display, which may send and receive data from the chock 100 and/or the dual chock system 101 which may be displayed within the asset 18. The network 30 may also include off-board computer systems that are off-board any aircraft, and/or computer systems comprising a combination of on-board and off-board components (e.g., the digital device 32 and the handheld digital device 34). Additionally, the network 30 may include elements permitting communication between computer systems on-board aircraft and computer systems on the ground. The network 30 may be a peer-to-peer network of nodes that collectively adheres to one or more protocols for various operations involving inter-node communication and management of the network 30. In such embodiments, membership in the network 30 may be restricted to pre-approved computer systems and/or computer systems belonging to pre-approved parties. In some embodiments, it is also possible for the network 30 to be a public network, such as the Internet. In some embodiments, the network 30 may be a private network within a public network (e.g., the Internet). Each of the nodes connected to the network 30 may have different functions, permissions, or privileges in performing operations pertaining to usage of the network 30.

Figure 8:
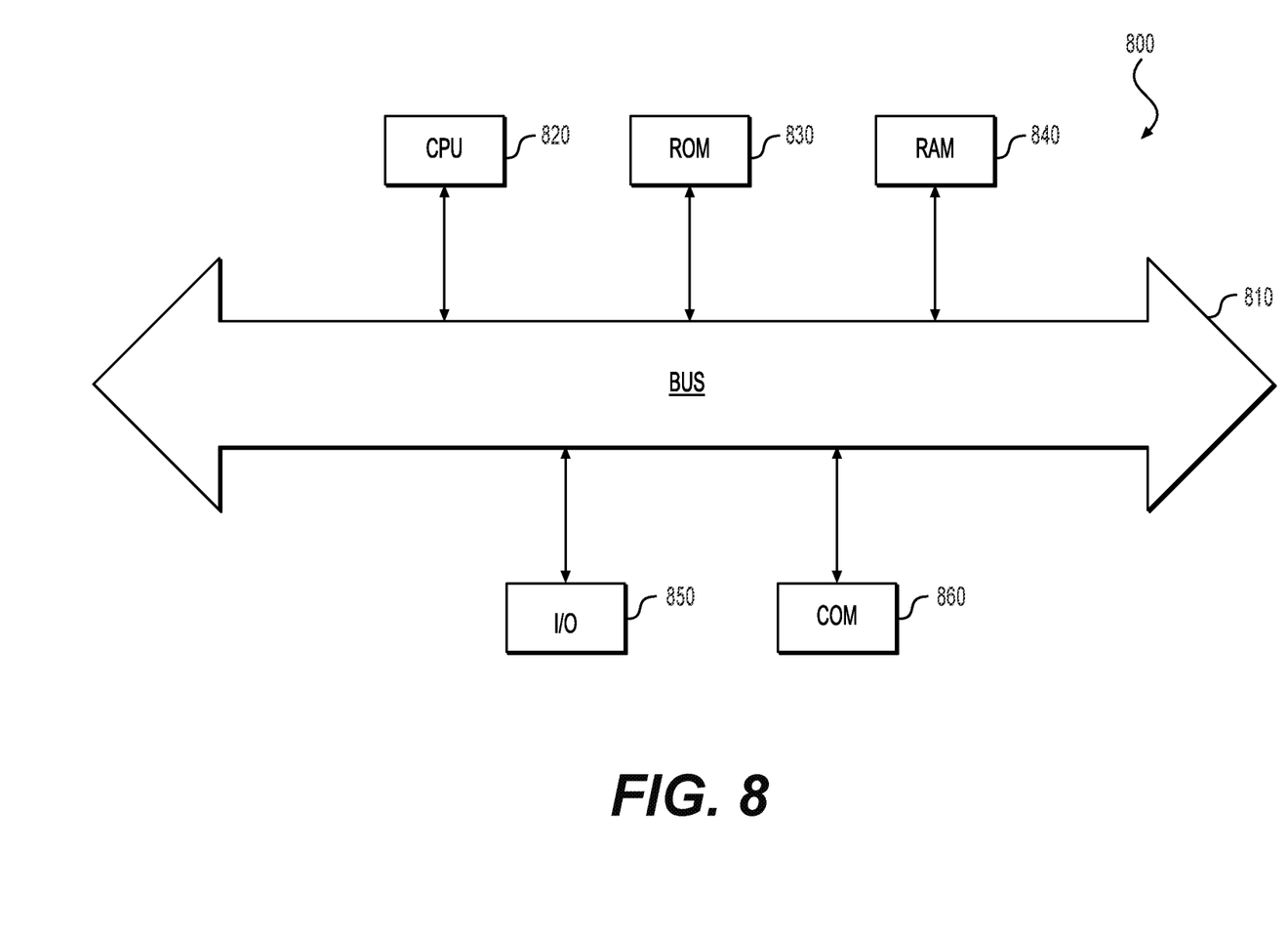
FIG. 8 is a simplified functional block diagram of a computing system for carrying out one or more of the functions of the embodiments described herein.

FIG. 8 is a simplified functional block diagram of a computing system 800 that may be configured for carrying out one or more of the steps, programs, and/or executing techniques described herein, according to exemplary embodiments of the present disclosure. Specifically, in one embodiment, any modules or computing resources of the chock 100 (e.g., the processor 121, memory 123) or other systems or features including computing resources may be an assembly of software and/or hardware including, for example, a data communication interface 860 for packet data communication. The platform may also include a central processing unit ("CPU") 820, in the form of one or more processors, for executing program instructions. The platform may include an internal communication bus 810, program storage, and data storage for various data files to be processed and/or communicated by the platform such as ROM 830 and RAM 840, although the system 800 may receive programming and data via network communications. The system 800 also may include input and output ports 850 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Any suitable system infrastructure may be put into place to allow for the assessment of models monitoring devices. FIG. 8 and the following discussion provide a brief, general description of a suitable computing environment in which certain embodiments and aspects thereof the present disclosure may be implemented. In one embodiment, any of the disclosed systems, methods, and/or graphical user interfaces may be executed by or implemented by a computing system consistent with or similar to that depicted in FIG. 8. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A smart wheel chock comprising:
 a chock body including a ground engaging surface and a wheel engaging surface for engaging a wheel of a vehicle;
 at least one processor housed within the chock body;
 a position tracking sensor housed within the chock body, wherein the position tracking sensor is configured to detect a location of the smart wheel chock;
 a wireless communication module in communication with the at least one processor and configured to transmit the location of the smart wheel chock;
 a power system configured to supply power to the at least one processor and the wireless communication module; and
 a visual indicator on the chock body, wherein the visual indicator includes a display in communication with the at least one processor, wherein the visual indicator is configured to be visible while the chock body is engaged with the wheel, and
 wherein the display is configured to display a unique identifier for the smart wheel chock.

2. The smart wheel chock of claim 1, wherein the wireless communication module transmits the location of the smart wheel chock via one or more of satellite communication, cellular communication, radio communication, and/or wireless local area network communication.

3. The smart wheel chock of claim 1, wherein the power system includes one or more solar panels.

4. The smart wheel chock of claim 1, wherein the power system includes a rechargeable power supply.

5. The smart wheel chock of claim 4, wherein the power system includes a charging port for providing power to the rechargeable power supply.

6. The smart wheel chock of claim 1, wherein the unique identifier for the smart wheel chock includes a quick response (QR) code.

7. The smart wheel chock of claim 1, further comprising a camera.

8. The smart wheel chock of claim 1, wherein the chock body includes a plurality of wheel engaging surfaces configured to engage the wheel at least two points on the wheel, wherein the at least two points are on opposite sides of the wheel with respect to a ground contact point of the wheel.

9. The smart wheel chock of claim 1, wherein the unique identifier corresponds to a record in an external database.

10. The smart wheel chock of claim 9, wherein the external database is external to the smart wheel chock and the unique identifier is associated with the smart wheel chock in the external database.

11. The smart wheel chock of claim 1, wherein the unique identifier is configured to be scanned by a user.

12. The smart wheel chock of claim 1, wherein the power system includes a removable battery.

13. The smart wheel chock of claim 1, further comprising at least one light on the chock body, wherein the at least one light is powered by the power system.

14. A smart wheel chock system for a vehicle comprising:
  a user chock locating device;
  a chock assembly including a plurality of chock bodies, each chock body including a ground engaging surface and a wheel engaging surface, wherein the chock assembly is configured to engage a wheel at at least two points, wherein the at least two points are on opposite sides of the wheel with respect to a ground contact point of the wheel;
  at least one processor housed within at least one of the plurality of chock bodies;
  a position tracking sensor housed within at least one of the plurality of chock bodies, wherein the position tracking sensor is configured to detect a location of the smart wheel chock system;
  a wireless communication module in communication with the at least one processor and configured to transmit the location of the smart wheel chock system to the user chock locating device;
  a power supply configured to provide power to the at least one processor and the wireless communication module; and
  a visual indicator on at least a non-ground or wheel engaging surface of the chock assembly, wherein the visual indicator includes a display in communication with the at least one processor, wherein the visual indicator is configured to remains visible when the chock assembly is engaged with a wheel of the vehicle, and wherein the display is configured to display a unique identifier for the smart wheel chock system.

15. The smart wheel chock system of claim 14, wherein the wireless communication module transmits the location of the smart wheel chock system to the user chock locating device via one or more of satellite communication, cellular communication, radio communication, and/or wireless local area network communication.

16. The smart wheel chock system of claim 14, wherein the smart wheel chock system includes one or more solar panels that are configured to charge the power supply.

17. The smart wheel chock system of claim 14, wherein at least one of the plurality of chock bodies includes a connector inlet configured to receive a connector for coupling to another chock body.

18. The smart wheel chock system of claim 14, further comprising a connector coupling at least two of the plurality of chock bodies.

19. A smart wheel chock comprising:
  a chock body including a ground engaging surface and a wheel engaging surface for engaging a wheel of a vehicle;
  at least one processor housed within the chock body;
  a position tracking sensor housed within the chock body, wherein the position tracking sensor is configured to detect a location of the smart wheel chock;
  a wireless communication module in communication with the at least one processor and configured to transmit the location of the smart wheel chock;
  a power system configured to supply power to the at least one processor and the wireless communication module;
  a visual indicator on the chock body, wherein the visual indicator is configured to be visible while the chock body is engaged with the wheel, wherein the visual indicator includes a unique identifier for the smart wheel chock; and
  a camera.

20. The smart wheel chock of claim 19, wherein the camera is configured to capture one or more images of an identifying mark on the vehicle.

* * * * *